US012776608B2

(12) United States Patent
Ji et al.

(10) Patent No.: US 12,776,608 B2
(45) Date of Patent: Oct. 27, 2026

(54) PLUG TAB WITH ERROR PREVENTIVE PART AND CONTACTOR

(71) Applicant: Xiamen Hongfa Electrical Safety & Controls Co., Ltd., Xiamen (CN)

(72) Inventors: Xiaoju Ji, Xiamen (CN); Xiaoming Ke, Xiamen (CN); Xieli Zhang, Xiamen (CN); Rencan Huang, Xiamen (CN)

(73) Assignee: Xiamen Hongfa Electrical Safety & Controls Co., Ltd., Xiamen (CN)

( * ) Notice: Subject to any disclaimer, the term of this patent is extended or adjusted under 35 U.S.C. 154(b) by 355 days.

(21) Appl. No.: 18/098,176

(22) Filed: Jan. 18, 2023

(65) Prior Publication Data

US 2023/0420887 A1 Dec. 28, 2023

(30) Foreign Application Priority Data

Jun. 28, 2022 (CN) ......................... 202210752825.3

(51) Int. Cl.
*H01R 13/642* (2006.01)
*H01H 50/14* (2006.01)

(52) U.S. Cl.
CPC ........... *H01R 13/642* (2013.01); *H01H 50/14* (2013.01); *H01H 2207/022* (2013.01)

(58) Field of Classification Search
CPC ............... H01H 2011/0037–2001/5872; H01R 9/24–13/642; H01R 13/64
See application file for complete search history.

(56) References Cited

U.S. PATENT DOCUMENTS

| | | | | |
|---|---|---|---|---|
| 4,872,262 A * | 10/1989 | Marach | .................. | H01R 43/20 29/874 |
| 5,082,452 A * | 1/1992 | Takano | .................. | H01R 33/02 439/850 |

(Continued)

FOREIGN PATENT DOCUMENTS

| | | |
|---|---|---|
| CN | 2922185 Y | 7/2007 |
| CN | 111801852 A | 10/2020 |

(Continued)

OTHER PUBLICATIONS

Chinese Office Action dated Feb. 27, 2026, in connection with Chinese Application No. 202210752825.3, with English translation thereof.

(Continued)

*Primary Examiner* — Edwin A. Leon
(74) *Attorney, Agent, or Firm* — Wolf, Greenfield & Sacks, P.C.

(57) ABSTRACT

A plug tab includes a body connected to a first conductive member, a plug-in part disposed on the body to be detachably connected to a first terminal, and an error preventing part disposed on the body and interfering with plugging of a second terminal into the plug-in part. The first terminal and the second terminal are different. Conduction between the first conductive member and the external current is realized by the plug-in part detachably connecting to the first terminal. The error preventing part interferes with plugging of the second terminal into the plug-in part by the arrangement of the error preventing part such that the plug tab can only be corresponding to and matching with the first terminal.

18 Claims, 5 Drawing Sheets

(56) References Cited

U.S. PATENT DOCUMENTS

| | | | | |
|---|---|---|---|---|
| 6,390,860 | B2 * | 5/2002 | Shirouzu | H01R 13/642 439/752.5 |
| 8,188,393 | B2 * | 5/2012 | McCormick | H01H 9/063 200/293 |

FOREIGN PATENT DOCUMENTS

| | | | |
|---|---|---|---|
| CN | 217589645 | U | 10/2022 |
| JP | 2009-016292 | A | 1/2009 |
| KR | 10-2009-0130730 | A | 12/2009 |

OTHER PUBLICATIONS

Chinese Second Office Action mailed Aug. 8, 2026, for Chinese Application No. 202210752825.3.

* cited by examiner

PLUG TAB WITH ERROR PREVENTIVE PART AND CONTACTOR

CROSS-REFERENCE TO RELATED APPLICATIONS

This application claims priority to Chinese Application No. 202210752825.3, filed on Jun. 28, 2022, which is incorporated herein by reference in its entirety.

TECHNICAL FIELD

The present invention generally relates to the technical field of electric power, and in particular to a plug tab and a contactor.

BACKGROUND

The existing load such as the compressor of the air-conditioner and fan are controlled to be connected or disconnected by contactor. The contactor uses a main circuit terminal to receive and transmit power from the power system, but some loads with low current also use main circuit plug tabs to receive and transmit power from the power system.

A main circuit plug tab is generally used to receive or transmit power for the loads with a low current, such as collect transmitted signals for monitoring the closed or opened state of the main circuit. Since the main circuit plug tab is connected to the main circuit terminals, the voltage specifications received or transmitted by the main circuit plug tab are generally larger than the safe voltage of human body, such as the commonly used voltage specifications of 120 VAC/240 VAC/480 VAC/600 VAC in North America and 220 VAC/380 VAC in China. However, the coil voltage, as the voltage to control the contactor to close, is often inconsistent with the voltage of the main circuit. At present, most systems adopt 24 VAC voltage, which is lower than the safe voltage of human body.

In a conventional application of the contactor, the coil plug tabs and the main circuit plug tabs usually adopt the same specifications, and the main circuit and the coil may be wrongly wired in the wiring process. In order to solve this problem, there are three ways to distinguish the main circuit and the coil for solving it:

First, distinguish by color, that is, distinguish by using terminals of different colors, wires of different colors, or by labels, i.e., distinguish by using coil wiring terminals and main circuit wiring terminals with different identification numbers. However, wrong wiring is still inevitable, resulting in serious consequences such as equipment short circuit.

Second, change the coil interface structure and add additional wire cable for preventing the coil from wrongly wiring. However, the use of the additional wire cable and the associated wiring process increases the cost, and requires a large installation space, which affects the wiring of users.

Third, the coil plug tab and the main circuit plug tab adopt different specifications. There may be problem that some coil terminals cannot be plugged into the main circuit, but the main circuit plug tab may still be plugged into the coil plug tab.

SUMMARY

The plug tab and contactor provided by the invention can reduce the risk of wrong wiring of the coil and the main circuit and improve safety.

An embodiment of the invention provides plug tab including:

a body connected to a first conductive member;

a plug-in part disposed on the body, the plug-in part is configured to be detachably connected to a first terminal; and an error preventing part disposed on the body, to interfere with plugging of a second terminal into the plug-in part;

wherein the first terminal and the second terminal are different.

In some embodiments, the body, the plug-in part and the error preventing part are in an integrated structure.

In some embodiments, the error preventing part is a bending structure;

the error preventing part includes a connecting part and a bending part, the connecting part and the plug-in part are arranged in parallel intervals, the connecting part has one end connected to the body and the other end is connected to the bending part, and the bending part is arranged at an included angle respective to the connecting part.

In some embodiments, the error preventing part protrudes from the body, such that the error preventing part serves to assist heat dissipation of the plug-in part.

In some embodiments, along a first direction, a height of the plug-in part is h, and a height of the error preventing part is h1; and wherein $h1 \geq h/2$.

In some embodiments, at least one plug-in part is arranged to form a plug-in unit, and the plug-in unit is used for plugging-in of the first terminal; and the error preventing part is provided by two, and the two error preventing parts are respectively located on both sides of the plug-in unit.

An embodiment of the invention further provides a contactor which includes a first conductive member, a first terminal, a second terminal, and a plug tab as mentioned above, a body of the plug tab is connected to the first conductive member, a plug-in part of the plug tab is disposed on the body, the plug-in part is configured to be detachably connected to the first terminal, an error preventing part of the plug tab is disposed on the body to interfere with plugging of the second terminal into the plug-in part; wherein the first terminal and the second terminal are different.

In some embodiments, at least one plug-in part is arranged to form a plug-in unit along a second direction, and the plug-in unit is used for plugging-in of the first terminal; and along the second direction, a distance between the error preventing part and the side of any one of the plug-in part in the plug-in unit closed to each other is d1, and a width of an outer wall of the second terminal is D2;

wherein $d1 < D2$;

along the second direction, a width of the plug-in unit is d2, and a width of an inner cavity of the second terminal is D1;

wherein $d2 > D1$;

along a third direction, a thickness of an end of the error preventing part away from the body is t1, and a thickness of the inner cavity of the second terminal is T1;

wherein $t1 > T1$;

wherein the second direction and the third direction are perpendicular to each other.

In some embodiments, a gap is disposed between the error preventing part and the adjacent plug-in part, and the gap serves to limit the first terminal;

the first terminal is clamped by the gap.

In some embodiments, along a first direction, a height of the first terminal is smaller than that of the second terminal; and/or along a second direction, a width of the first terminal is smaller than that of the second terminal; and/or along a third direction, a thickness of the first terminal is smaller than that of the second terminal;

wherein the first direction, the second direction, and the third direction are perpendicular to each other.

In some embodiments, the contactor further comprises a plug-in tab and a second conductive member, one end of the plug-in tab is connected to the second conductive member, and the other end of the plug-in tab is configured to be detachably connected to the second terminal.

In some embodiments, the first conductive member is a coil, the plug tab is a coil plug tab, and the first terminal is a coil terminal;

the second conductive member is a static contact, the plug-in tab is a main circuit plug tab, and the second terminal is a main circuit terminal.

An embodiment of the invention has the following advantages or beneficial effects:

The plug tab provided by the embodiment is connected to the first conductive member through the body, so as to realize an electrical connection between the plug tab and the first conductive member. The plug-in parts disposed on the body and the error preventing part disposed on the body, and thusly the body plays a role in supporting the plug-in parts and the error preventing part as a whole. Moreover, the plug-in parts configured to be detachably connected to the first terminal, the first terminal can be directly plugged-in the plug tab, and thusly the conduction between the first conductive member and the external current can be realized under the action of an intermediate connection between the plug-in parts and the first terminal. By the arrangement of the error preventing part, the error preventing part can interfere with plugging of the second terminal into the plug-in parts, such that the plug tab can only be corresponding to and matching with the first terminal, and thusly preventing the second terminal from being plugged into the plug-in parts, playing the role of blocking and error-proofing, and reducing the equipment short circuit and other faults caused by the risk of wrong wiring. Meanwhile, compared with the existing way of adding wiring harness or distinguishing according to labels and colors, it reduces wiring cost and space, and has a high error-proof accuracy, and therefore improving the safety in use.

In the contactor provided by the embodiment of the invention, an electrical connection between the plug tab and the first conductive member is realized through the body connected to the first conductive member. The body plays a role in supporting the plug-in part and the error preventing part as a whole due to the plug-in part disposed on the body and the error preventing part disposed on the body. Moreover, a plugging-in can be realized directly between the first terminal and the plug tab by the plug-in part configured to be detachably connected to the first terminal, and the conduction between the first conductive member and the external current can be realized under the action of an intermediate connection between the plug-in part and the first terminal. The error preventing part can interfere with plugging-in of the second terminal into the plug-in part by the arrangement of the error preventing part, such that the plug tab can only be corresponding to and matching with the first terminal, thusly preventing the second terminal from being plugged into the plug-in part, playing the role of blocking and error-proofing, and reducing the equipment short circuit and other faults caused by the risk of wrong wiring. Meanwhile, compared with the existing way of adding wiring harness or distinguishing according to labels and colors, it reduces wiring cost and space, and has a high error-proof accuracy, thusly improving the safety in use.

BRIEF DESCRIPTION OF THE DRAWINGS

The above and other features and advantages of the present invention will be more apparent by the detail description of its exemplary embodiments with reference to the accompanying drawings.

DETAILED DESCRIPTION

Figure 1:
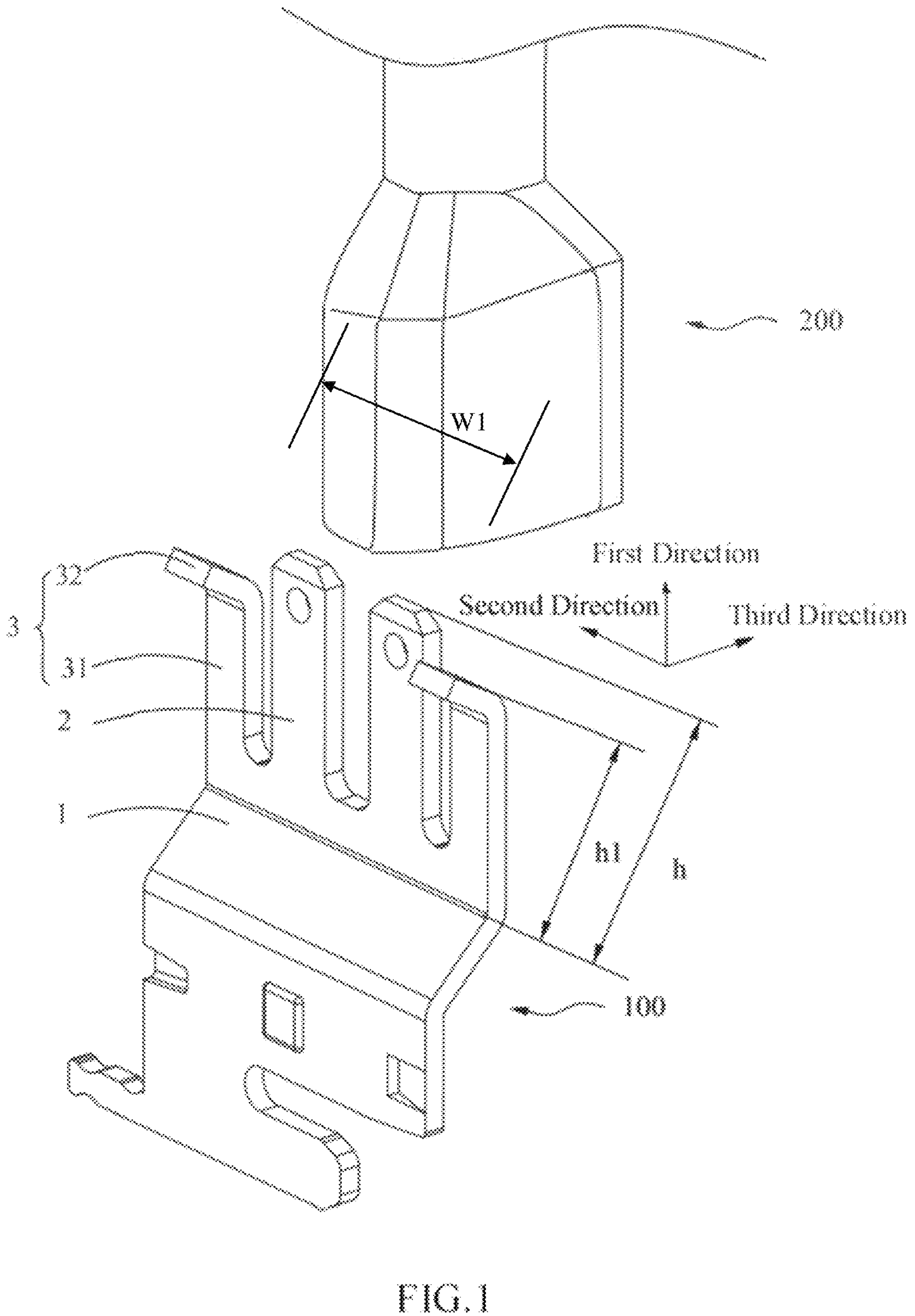
FIG. 1 shows a schematic fitting diagram of a plug tab and a first terminal according to the invention.

Now exemplary embodiments will be described more fully with reference to the accompanying drawings. However, the example embodiments can be implemented in various forms and should not be construed as limited to the embodiments set forth herein. On the contrary, these embodiments are provided so that this invention will be thorough and complete, and the concept of the exemplary embodiments will be fully conveyed to those skilled in the art. Same reference numerals in the drawings indicate the same or similar structures, so their detailed description will be omitted.

The existing contactors substantively use weak current to control on/off of strong current. No matter weak current or strong current, both on and off are realized by plugging-in or unplugging-in of their plug tabs and corresponding terminals. If the plug tabs of the same specification are used, a risk of wrong wiring may be caused, which will lead to serious consequences such as short circuit of equipment.

Figure 6:
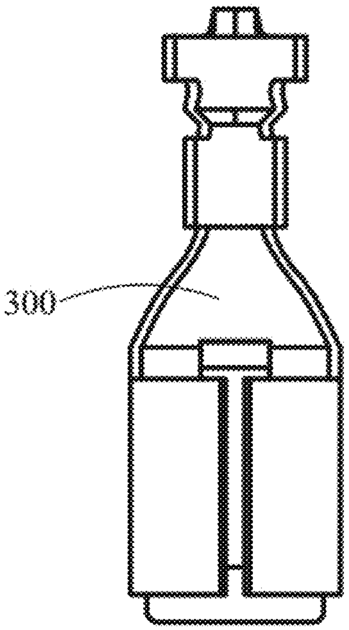
FIG. 6 is a top view showing the schematic structure diagram of a second terminal according to the invention.

In order to solve this problem, this embodiment provides a plug tab 100. As shown in FIG. 1, the plug tab 100 includes a body 1, a plug-in part 2, and an error preventing part 3. The body 1 is connected to a first conductive member. The plug-in part 2 is disposed on the body 1, and the plug-in part 2 is configured to be detachably connected to a first terminal 200. The error preventing part 3 is disposed on the body 1 to interfere with plugging of the terminals different from the terminal 200, such as the second terminal 300 (as shown in FIG. 6) into the plug-in part 2. The first terminal 200 is different from the second terminal 300.

In the plug tab 100 provided by the embodiment, an electrical connection between the plug tab 100 and the first conductive member is realized by the body 1 connected to the first conductive member. The body 1 plays a role in supporting the plug-in part 2 and the error preventing part 3 as a whole by the plug-in part 2 disposed on the body 1 and the error preventing part 3 disposed on the body 1. Moreover, a plugging-in can be realized directly between the first terminal 200 and the plug tab 100 by the plug-in part 2 configured to be detachably connected to the first terminal 200, and under the action of an intermediate connection between the plug-in part 2 and the first terminal 200, the conduction between the first conductive member and the external current can be realized. The error preventing part 3 can interfere with plugging of the second terminal 300 into the plug-in part 2 by the arrangement of the error preventing part 3, such that the plug tab 100 can only be corresponding to and matching with the first terminal 200, thusly preventing the second terminal 300 from being plugged into the plug-in part 2, playing the role of blocking and error-proofing, and reducing the equipment short circuit and other faults caused by the risk of wrong wiring. Meanwhile, compared with the existing way of adding wiring harness or distinguishing according to labels and colors, it reduces wiring cost and space, and has a high error-proof accuracy, thusly improving the safety in use.

It should be noted, an external current can be introduced into the first conductive member by the first terminal 200 and the plug-in part 2 through the mutual cooperation of the plug-in part 2 and the first terminal 200, and the external current is weak current at this time. Alternatively, it is also possible for the first conductive member to realize turning on or off of the external current through the first terminal 200 and the plug-in part 2, and the external current is strong current at this time. This embodiment does not limit the current flow direction, as long as it can reduce wrong wiring caused by confusing the first terminal 200 and the second terminal 300, it is within the protection scope of this embodiment.

In an embodiment, the body 1, the plug-in part 2 and the error preventing part 3 are in an integrated structure.

With such arrangement, the process of part assembling is reduced, and the production cost is saved. Furthermore, different from the prior art, which requires additional installation of error-proofing parts, the plug tab 100 itself has error-proofing and confusion-proofing function, and there is no need to additionally install error-proofing parts or reserve installation positions for error-proofing parts. Therefore, the plug tab 100 is simple in structure and convenient to use.

The plug-in part 2 has a shape similar to a sheet cuboid structure. The height direction of the plug-in part 2, i.e., the extension direction of the plug-in part 2, is defined as a first direction, the width direction of the plug-in part 2 is defined as a second direction, and the thickness direction of the plug-in part 2 is defined as a third direction. The first direction, the second direction, and third direction are perpendicular to each other.

In an embodiment, the error preventing part 3 is a bending structure.

Due to arranging the error preventing part 3 as a bending structure, the error preventing part 3 at least has an appearance different from that of the plug-in part 2, so the error preventing part 3 plays a direct identification role, and the plug tab 100 with the bending structure can be visually and quickly distinguished from other the plug tabs 100, thusly reducing the time and cost in trial and error process.

It can be understood, the bending structure can have any bending angle and length, or other deformed structures, or welded structures. Or alternatively, the body 1, the plug-in part 2, and the error preventing part 3 can be formed as integrated structure.

It should be specially noted that, in automatic production process of the plug tab 100, after the batch processing of multiple plug tabs 100 is realized, a pick-up mechanism is required to perform picking up. The pick-up mechanism includes a vibrating disc with a circular bottom structure and a direct vibrating pick-up assembly connected to the vibrating disc. Plug tabs 100 can be manually fed into a hopper of the vibrating disc by the operator. A pulse electromagnet is provided under the hopper of the vibrating disc, such that the hopper may perform a vertical vibration, and an inclined leaf spring brings the hopper to perform a torsional vibration around its vertical axis, such that several plug tabs 100 placed in the hopper rise along a spiral track under the vibration. In the rising process, the plug tabs 100 going through the spiral track can be arranged in a certain order and enter the interior of the direct vibrating pick-up assembly in a unified state. Based on the same principle, the direct vibrating pick-up assembly includes a pick-up rail, which is internally provided with a fixing groove for fixing the plug tabs 100, and the pick-up rail vibrates in the moving direction of the plug tabs 100.

Since the error preventing part 3 of the plug tab 100 is a bending structure, and the bending structure is at least partially arranged in the fixing groove, under cooperation of the bending structure and the fixing groove, a guiding role is played to ensure the smoothness of the movement of the plug tabs 100. Meanwhile, during transportation of the plug tabs 100, the operator can judge the front or back side of the plug tabs 100 based on the bending direction of the error preventing part 3, which plays the role of marking the front and back side. It can be understood that it is not limited to the conveying process of the plug tabs 100, but also in the process of the installation of the plug tabs 100 or actual use of the contactor, the bending direction of the error preventing part 3 can plays the role of marking the front and back side.

Specifically, as shown in FIG. 1, the error preventing part 3 includes a connecting part 31 and a bending part 32. The connecting part 31 and the plug-in part 2 are arranged in parallel intervals, and the connecting part 31 has one end connected to the body 1 and the other end connected to the bending part 32. The bending part 32 is arranged at an included angle with the connecting part 31.

Since the connecting part 31 has one end connected to the body 1 and the other end connected to the bending part 32, the connecting part 31 plays a role of an intermediate connection while realizing fixation between the error preventing part 3 and the body 1, and the connecting part 31 provides a setting position for the bending part 32. An avoidance space is provided for the first terminal 200 to be plugged in the plug-in part 2 through the connecting part 31 and the plug-in part 2 are arranged in a parallel and spaced, and the heat dissipation space is reserved for the plug-in part 2 at the same time. The bending part 32 and the connecting part 31 are not located in the same plane since the bending part 32 is arranged at an included angle respective to the connecting part 31, and the error preventing part 3 as a whole is approximate to a three-dimensional structure, which plays a significant role in marking.

It should be specially noted that, when the error preventing part 3 is processed, the end of the connecting part 31 far from the body 1 is nearly suspended in the air, which can also be called as a free end, and the free end is bent to form the bending part 32.

In an embodiment, the error preventing part 3 protrudes from the body 1, such that the error preventing part 3 may serve to assist heat dissipation of the plug-in part 2.

In other words, the error preventing part 3 is arranged to be protruded in respect to the body 1 along the first direction, which is equivalent to the error preventing part 3 is arranged to be extended in respect to the body 1. Since the plug-in part 2 will generate a large amount of heat during use, the error preventing part 3 plays a role in increasing the heat dissipation area and has a good heat dissipation effect, so as to reduce the temperature rise of the plug-in part 2 and the first terminal 200, and avoid the high temperature of the plug-in part 2 and the first terminal 200 affecting the use performance.

In an embodiment, along the first direction, the height of the plug-in part 2 is h, and the error preventing part 3 is h1, where $h1 \geq h/2$.

If $h1 < h/2$, that is, the height h1 of the error preventing part 3 is less than half of the height h of the plug-in part 2, the height of the error preventing part 3 is relatively low at this time, and along the first direction, the height difference between the top surface of the error preventing part 3 and the top surface of the plug-in part 2 is relatively large. In such case, even though the error preventing part 3 can interfere with the plugging-in of the second terminal 300, the second terminal 300 can only touch the error preventing part 3 after contacting the plug-in part 2 and moving for a long distance, which may cause a delayed error-proofing. By setting $h1 \geq h/2$, the height h1 of the error preventing part 3 is larger than half of the height h of the plug-in part 2. At this time, the height of the error preventing part 3 is relatively high, and along the first direction, the height difference between the top surface of the error preventing part 3 and the top surface of the plug-in part 2 is relatively small. Accordingly, after the second terminal 300 contacts the plug-in part 2, it can touch the error preventing part 3 by moving only a short distance, resulting in a shorter trial and error time, a faster response speed, ensuring the timeliness and effectiveness of the trial and error.

It can be understood that, along the first direction, the top surface of the error preventing part 3 can be flush with the top surface of the plug-in part 2, or the top surface of the error preventing part 3 can be higher than the top surface of the plug-in part 2. This embodiment does not limit whether the top surface of the error preventing part 3 is flush with the top surface of the plug-in part 2, as long as the rapidity of trial and error can be better ensured, it is within the protection scope of this embodiment.

In an embodiment, along the second direction, at least one plug-in part 2 is arranged to form a plug-in unit, and the plug-in unit is used for plugging-in of the first terminal 200. The error preventing part 3 may be provided by two, and the two error preventing parts 3 are respectively located on both sides of the plug-in unit, and the second direction and the first direction are perpendicular to each other.

If the plug-in part 2 is provided by one, the one plug-in part 2 constitutes one plug-in unit, and the one plug-in part 2 is corresponding to the first terminal 200 to complete the plug-in process, and can serve to transmit a performance detection signal and the like at this time. By two error preventing parts 3 respectively located on both sides of the plug-in part 2, the two error preventing parts 3 sandwich one plug-in part 2 therebetween, playing a protective role, and at the same time, if the second terminal 300 is plugged into the plug-in part 2, the two error preventing parts 3 carry out side wrapping in respect to the plug-in part 2, the two error preventing parts 3 can simultaneously interfere with the second terminal 300.

If the plug-in part 2 is provided by a plurality, the plurality of plug-in parts 2 are arranged in parallel at intervals to form a plug-in unit, and one plug-in unit is corresponding to the first terminal 200 to complete the plug-in process. At this time, since the plug-in unit includes a plurality of plug-in parts 2, some of the plug-in parts 2 can realize current transmission, and the other plug-in parts 2 can serve to transmit a performance detection signal and the like. The two error preventing parts 3 sandwich one plug-in unit therebetween by two error preventing parts 3 respectively located on both sides of the plug-in unit, and thusly playing a protective role, and at the same time, if the second terminal 300 is plugged into the plug-in unit, the two error preventing parts 3 carry out side wrapping in respect to the plug-in unit, the two error preventing parts 3 can simultaneously interfere with the second terminal 300.

A contactor 10 is also provided according to the invention. The contactor 10 includes a first conductive member (not shown), a first terminal 200, terminals different from the first terminals, such as a second terminal 300, and the above-mentioned plug tab 100. The body 1 of the plug tab 100 is connected to the first conductive member, the plug-in part 2 of the plug tab 100 is disposed on the body 1, and the plug-in part 2 is configured to be detachably connected to the first terminal 200. The error preventing part 3 of the plug tab 100 is disposed on the body 1 to interfere with plugging of the second terminal 300 into the plug-in part 2. The first terminal 200 and the second terminal 300 are different.

In the contactor 10 provided by the embodiment of the invention, an electrical connection between the plug tab 100 and the first conductive member is realized by the body 1 connected to the first conductive member. The body 1 plays a role in supporting the plug-in part 2 and the error preventing part 3 as a whole by the plug-in part 2 disposed on the body 1 and the error preventing part 3 disposed on the body 1. Moreover, a plugging-in can be realized directly between the first terminal 200 and the plug tab 100 by the plug-in part 2 configured to be detachably connected to the first terminal 200, and the conduction between the first conductive member and the external current can be realized under the action of an intermediate connection between the plug-in part 2 and the first terminal 200. The error preventing part 3 can interfere with plugging of the second terminal 300 into the plug-in part 2 due to the arrangement of the error preventing part 3, such that the plug tab 100 can only be corresponding to and matching with the first terminal 200, thusly preventing the second terminal 300 from being plugged into the plug-in part 2, playing the role of blocking and error-proofing, and reducing the equipment short circuit and other faults caused by the risk of wrong wiring. Meanwhile, compared with the existing way of adding wiring harness or distinguishing according to labels and colors, it reduces wiring cost and space, and has a high error-proofing accuracy, thusly improving the safety in use.

In an embodiment, at least one plug-in part 2 is arranged to form a plug-in unit along the second direction, and the plug-in unit is used for plugging-in of the first terminal 200.

It can be understood that, the number of the plug-in parts 2 is not limited in a plug-in unit, and the number of the plug-in parts 2 can be adjusted according to actual production requirements. The plug-in parts 2 may be provided by one, two or more. For the plug-in part 2 at an outermost side of the plug-in unit, its two sides are respectively adjacent to an error preventing part 3 and another plug-in part 2. For the plug-in part 2 at a non-outermost of the plug-in unit, its two sides are respectively adjacent to the other two plug-in parts 2.

Figure 2:
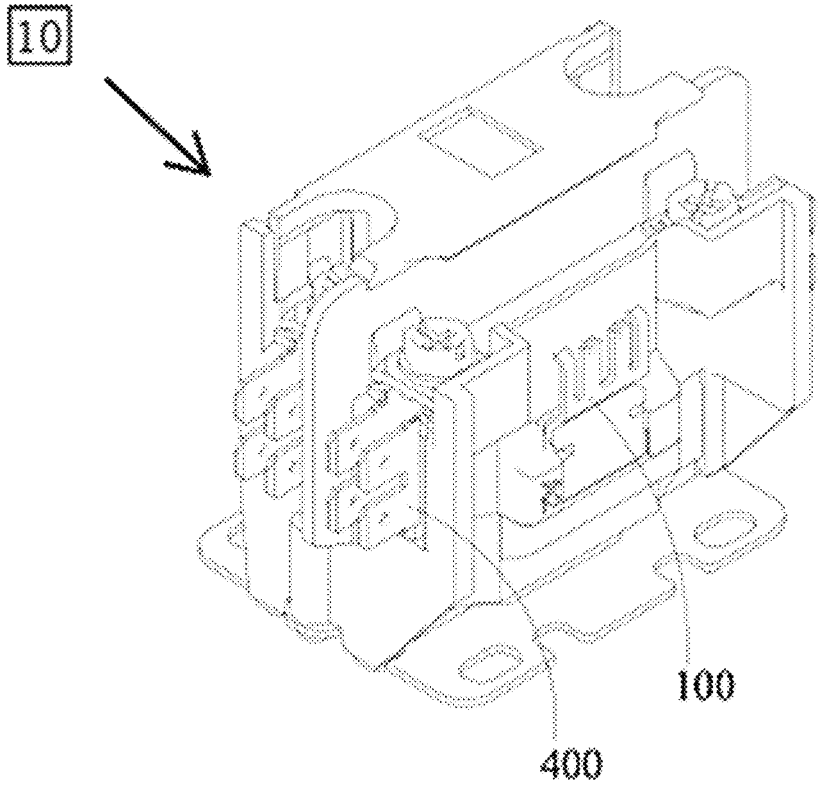
FIG. 2 is a perspective view showing the schematic structure of the plug tab and the plug-in tab of a contactor according to the invention.
Figure 3:
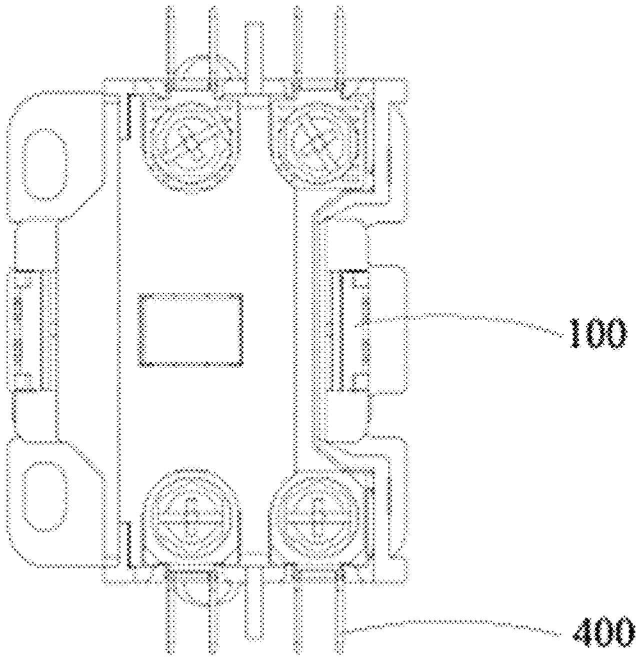
FIG. 3 is a top view showing the schematic structure of the plug tab and the plug-in tab according to the invention.
Figure 4:
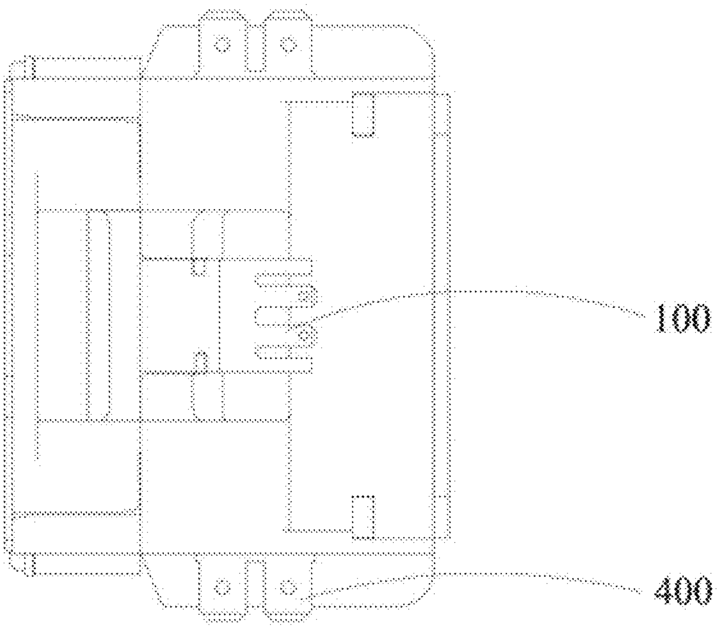
FIG. 4 is a front view showing the schematic structure of the plug tab and the plug-in tab according to the invention.

In an embodiment, as shown in FIGS. 2-4, the contactor 10 further includes a plug-in tab 400 and a second conductive member. One end of the plug-in tab 400 is connected to the second conductive member, and the other end of the plug-in tab 400 is configured to be detachably connected to the second terminal 300.

An electrical connection between the plug-in tab 400 and the second conductive member is realized by the plug-in tab 400 connected to the second conductive member. A plugging-in can be directly realized between the second terminal 300 and the plug-in tab 400 by the plug-in tab 400 configured to be detachably connected to the second terminal 300, and the conduction between the second conductive member and the external current is realized under the action of an intermediate connection between the plug-in tab 400 and the second terminal 300.

It should be noted that, an external current can be introduced into the second conductive member by the second terminal 300 and the plug-in tab 400 through the mutual cooperation of the plug-in tab 400 and the second terminal 300, and the external current is weak current at this time. Alternatively, it is also possible for the second conductive member to realize turning on or off of the external current through the second terminal 300 and the plug-in tab 400, and the external current is strong current at this time. This embodiment does not limit the current flow direction, as long as it can reduce wrong wiring caused by confusing the first terminal 200 and the second terminal 300, it is within the protection scope of this embodiment.

It can be understood that, the first conductive member is a coil 900, the plug tab 100 is a coil plug tab, and the first terminal 200 is a coil terminal; the second conductive member is a static contact, the plug-in tab 400 is a main circuit plug tab, and the second terminal 300 is a main circuit terminal.

In other words, the plug tab 100 is a coil plug tab, the plug tab 100 is directly connected to the coil 900, and the coil 900 is wound on a coil bobbin. The coil bobbin is provided with a wiring slot and an installation slot. Specifically, after the coil 900 is wound on the coil bobbin, a free end of the coil 900, i.e., an end of the enameled wire, is led into the installation slot along the wiring slot, and the body 1 of the plug tab 100 is at least partially plugged into the installation slot, so as to realize an electrical connection between the plug tab 100 and the coil 900 for completing the current input process.

The plug-in tab 400 is the main circuit plug tab, and the plug-in tab 400 is fixedly connected to the static contact. After the coil 900 is energized, magnetization of an iron core generates a magnetic force, which brings a bridge-shaped movable contact of the contact bridge 600 to move through a contact support 500. When the bridge-shaped movable contact and the static contact are pulled to attach with each other, load turning-on is realized. The main circuit plug tab is used to receive or transmit loads with low current, such as collecting transmitted signals, monitoring the closed or open state of the main circuit and the like.

Since the main circuit plug tab and the main circuit terminal are connected together, the voltage received or transmitted by the main circuit plug tab in specification is generally higher than the safe voltage of the human body. However, the voltage of the coil 900, as the voltage for controlling the contactor to close, is often inconsistent with the main circuit. If the main circuit terminal and the coil terminal are confused in the wiring process, wiring for the main circuit and the coil 900 may be wrongly wired, resulting in serious consequences such as short circuit of equipment.

Figure 5:
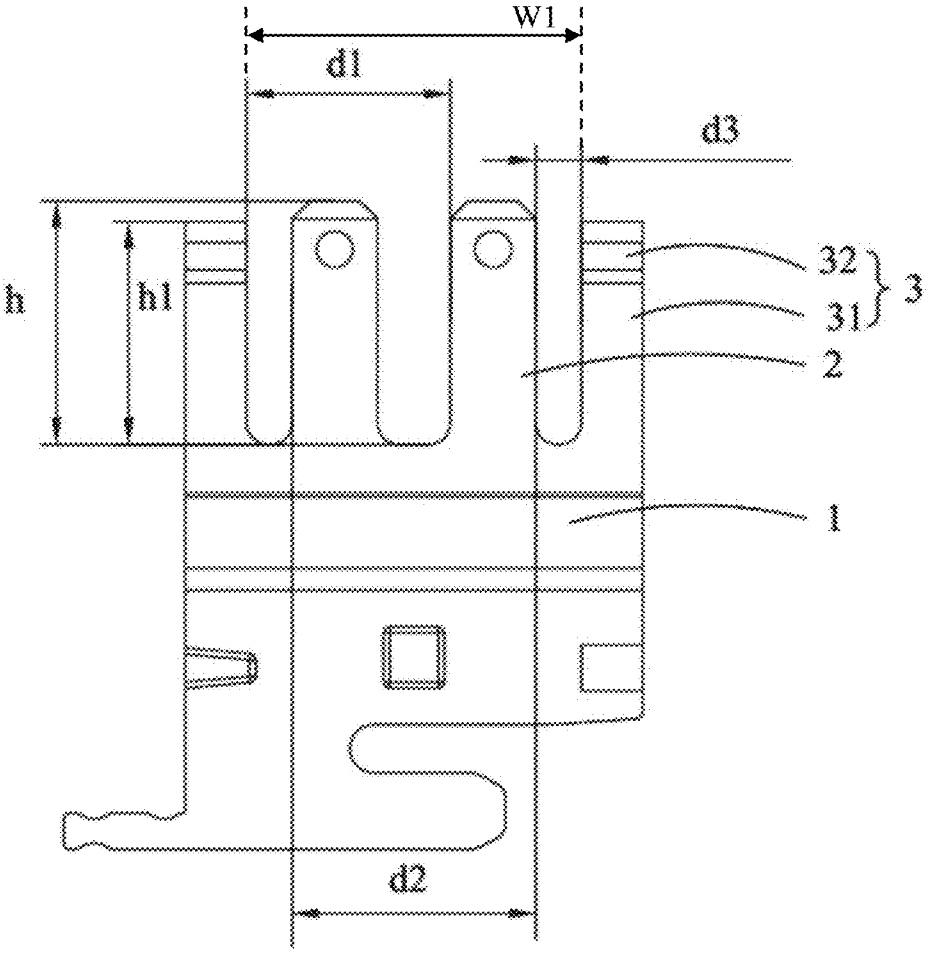
FIG. 5 shows the schematic structure of the plug tab according the invention.
Figure 7:
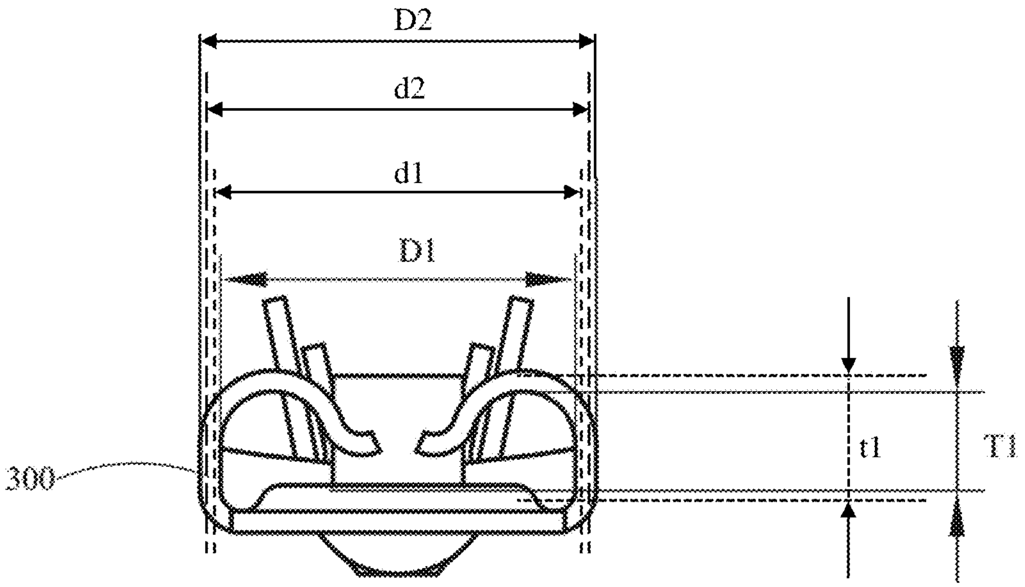
FIG. 7 is a front view showing the schematic structure of the second terminal according to the invention.

In order to solve this problem, as shown in FIGS. 5-7, along the second direction, the distance between the error preventing part 3 and the side of any one of the plug-in part 2 in the plug-in unit closed to each other is d1, and the width of the outer wall of the second terminal 300 is D2, wherein $d1<D2$.

If $d1>D2$, that is, the distance d1 between the error preventing part 3 and side of any one of the plug-in part 2 in the plug-in unit closed to each other is larger than the width D2 of the outer wall of the second terminal 300, at this time, an accommodation space is provided for the second terminal 300 between the inner side wall of the error preventing part 3 and the side wall of the plug-in parts 2, and a plugging-in can be realized between the second terminal 300 and at least one plug-in part 2 of the plug tab 100. Since the plug tab 100 can only be plugged with the first terminal 200, the second terminal 300 may also be plugged with the plug tab 100 at the same time, which is likely to cause the risk of incorrect plugging-in. By $d1<D2$, that is, the distance d1 between the error preventing part 3 and the side of any one of the plug-in part 2 in the plug-in unit closed to each other is smaller than the width D2 of the outer wall of the second terminal 300, at this time, there is no accommodation space for the second terminal 300 between the inner side wall of the error preventing part 3 and the side wall of the plug-in part 2, which is corresponding that the inner edge of the error preventing part 3 at least partially abuts against the end face of the second terminal 300, and the error preventing part 3 interferes with plugging of the second terminal 300 into the plug-in part 2, so as to prevent the operator from mistaking the second terminal 300 as the first terminal 200 to be plugged-in by the plug tab 100, thusly realizing the error-proofing function.

It should be specially noted that, if the second terminal 300 is provided with a sheath, D2 should be the width of the second terminal 300 along with the sheath, such that the plug tab 100 cannot accommodate the second terminal 300.

In an embodiment, as shown in FIGS. 5-7, along the second direction, the width of the plug-in unit is d2, and the width of the inner cavity of the second terminal 300 is D1, wherein $d2>D1$.

If $d2<D1$, that is, the width d2 of the plug-in unit is smaller than the width D1 of the inner cavity of the second terminal 300, at this time, the plug-in unit as a whole can extend into the second terminal 300 to realize a plugging-in between the plug tab 100 and the second terminal 300. Since the plug tab 100 can only be plugged with the first terminal 200, the second terminal 300 may also be plugged with the plug tab 100 at this time, which is likely to cause the risk of incorrect plugging-in. By setting $d2>D1$, that is, the width d2 of the plug-in unit is larger than the width D1 of the inner cavity of the second terminal 300, at this time, the inner cavity of the second terminal 300 cannot accommodate the plug-in unit as a whole, and the two side edges of the plug-in unit along the second direction exceed the inner cavity of the second terminal 300, so the end face of the second terminal 300 can only contact with the plug-in unit of the plug tab 100, but the plug-in unit cannot be plugged into the inner cavity of the second terminal 300, so as to prevent the operator from mistaking the second terminal 300 as the first terminal 200 to be plugged-in by the plug tab 100, and thusly realizing the error-proofing function.

In an embodiment, a gap is disposed between the error preventing part 3 and the adjacent plug-in part 2, and the gap is used to limit the first terminal 200. The gap particularly refers to the distance d3 along the second direction between the error preventing part 3 and the adjacent the plug-in part 2.

After the contactor works for a period of time, the reliability of the cooperation between the plug tab 100 and the first terminal 200 may be reduced. For this reason, a gap is disposed between the error preventing part 3 and the adjacent plug-in part 2. The gap provides an accommodation space for the first terminal 200, and at the same time, the gap serves to limit the first terminal 200, which can assist wiring the first terminal 200. By controlling the size of d3, the swing of the first terminal 200 is restricted, and the wiring stability and reliability of the first terminal 200 are improved.

In an embodiment, the first terminal 200 is clamped by the gap.

Since the first terminal 200 is clamped by the gap, i.e., the gap can be smaller than or equal to the wall thickness of the first terminal 200 along the second direction, interference fit can be adopted between the gap and the first terminal 200, thusly further ensuring the plugging-in stability of the plug tab 100 and the first terminal 200. It can be understood that, since a gap is disposed between the error preventing part 3 and the adjacent plug-in part 2, the gap actually provides a deformation space for the error preventing part 3, such that the free end of the error preventing part 3 can firstly be moved away from the plug-in part 2 and the first terminal 200 may be easily clamped therein. After the free end of the error preventing part 3 is released, the error preventing part 3 is reset under its own restoring force, such that the inner side wall of the error preventing part 3 abuts against the first terminal 200 to achieve a better clamping effect.

Figure 8:
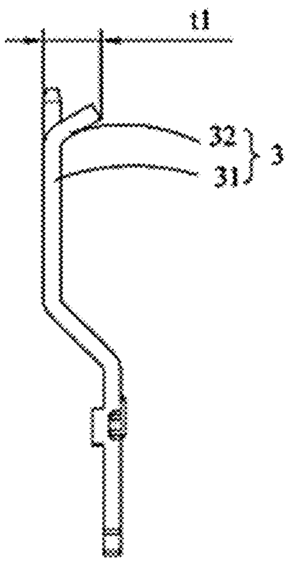
FIG. 8 shows the schematic structure of the error preventing part of the plug tab according to the invention.

In an embodiment, as shown in FIGS. 7-8, along the third direction, the thickness of the end of the error preventing part 3 away from the body 1 is t1, and the thickness of the inner cavity of the second terminal 300 is T1, wherein $t1>T1$. The first direction, the second direction, and the third direction are perpendicular to each other.

If $t1<T1$, that is, the thickness t1 of the end of the error preventing part 3 away from the body 1 is smaller than the thickness T1 of the inner cavity of the second terminal 300, at this time, the error preventing part 3 can extend into the second terminal 300, thusly it is also possible for the plug-in part 2 in a sheet structure to extend into the second terminal 300, such that a plugging-in is very likely to occur between the plug tab 100 and the second terminal 300. Since the plug tab 100 can only be plugged with the first terminal 200, the second terminal 300 may also be plugged with the plug tab 100 at this time, it is difficult to avoid the risk of the wrongly plugging-in. By setting $t1>T1$, that is, the thickness t1 of the end of the error preventing part 3 away from the body 1 is larger than the thickness T1 of the inner cavity of the second terminal 300, at this time, the error preventing part 3 cannot extend into the second terminal 300, the inner cavity of the second terminal 300 cannot accommodate the error preventing part 3, and the two side edges of the error preventing part 3 along the third direction exceed the inner cavity of the second terminal 300, so the end face of the second terminal 300 can only contact with the error preventing part 3, but the error preventing part 3 cannot be plugged into the inner cavity of the second terminal 300, so as to prevent the operator from mistaking the second terminal 300 as the first terminal 200 to be plugged-in by the plug tab 100, thusly realizing the error-proofing function.

In an embodiment, along the first direction, the height of the first terminal 200 is smaller than that of the second terminal 300; and/or along the second direction, the width W1 of the first terminal 200 is smaller than that of the second terminal 300; and/or along the third direction, the thickness of the first terminal 200 is smaller than that of the second terminal 300. The first direction, the second direction, and the third direction are perpendicular to each other.

In other words, the dimension of the first terminal 200 is smaller than that of the second terminal 300. Since the second terminal 300 is fit with the plug-in tab 400, the first terminal 200 is fit with the plug tab 100, and the dimension of the plug tab 100 is smaller than that of the plug-in tab 400, it can be concluded that the dimension of the plug-in tab 400 is relatively large, and the dimension of first terminal 200 is relatively small, so the first terminal 200 with a relatively small dimension cannot be plugged-in the plug-in tab 400 with a relatively larger dimension, so as to prevent the operator from mistaking the first terminal 200 as the second terminal 300 to be plugged-in by the plug-in tab 400, thusly realizing the error-proofing function.

It should be specially noted that, the plug-in tab 400, i.e., the main circuit plug tab, adopts but not limited to the specification "0.250 in×0.032 in", while the plug tab 100, i.e., the coil plug tab, adopts but not limited to the specification "0.110 in×0.032 in", and it is necessary to ensure that the coil plug tab and the main circuit plug tab adopt plug tabs of different specifications to match different terminals.

It should be specially noted that, an "in" specifically refers to an inch.

It should be specially noted that, the plug tab 100 provided in this embodiment can at least simultaneously realize the following functions by arranging the error preventing part 3: 1. the plug tab 100 itself has an error-proofing function, which prevents the second terminal 300 from being plugged into the plug-in part 2, and plays the role of blocking and error/confusion-proofing; 2. the error preventing part 3 serves to assist the plug-in part 2 to dissipate heat; 3. under the cooperation of the bending structure and the fixing groove, it plays a guiding role to ensure smoothness of the movement of the plug tab 100; 4. it is not limited to the conveying process of the plug tab 100, in the process of installing the plug tab or actually using the contactor, it can also play the role of marking front and back according to the bending direction of the error preventing part 3; 5. a gap is disposed between the error preventing part 3 and the adjacent plug-in part 2, and the gap serves to limit the first terminal 200.

Figure 9:
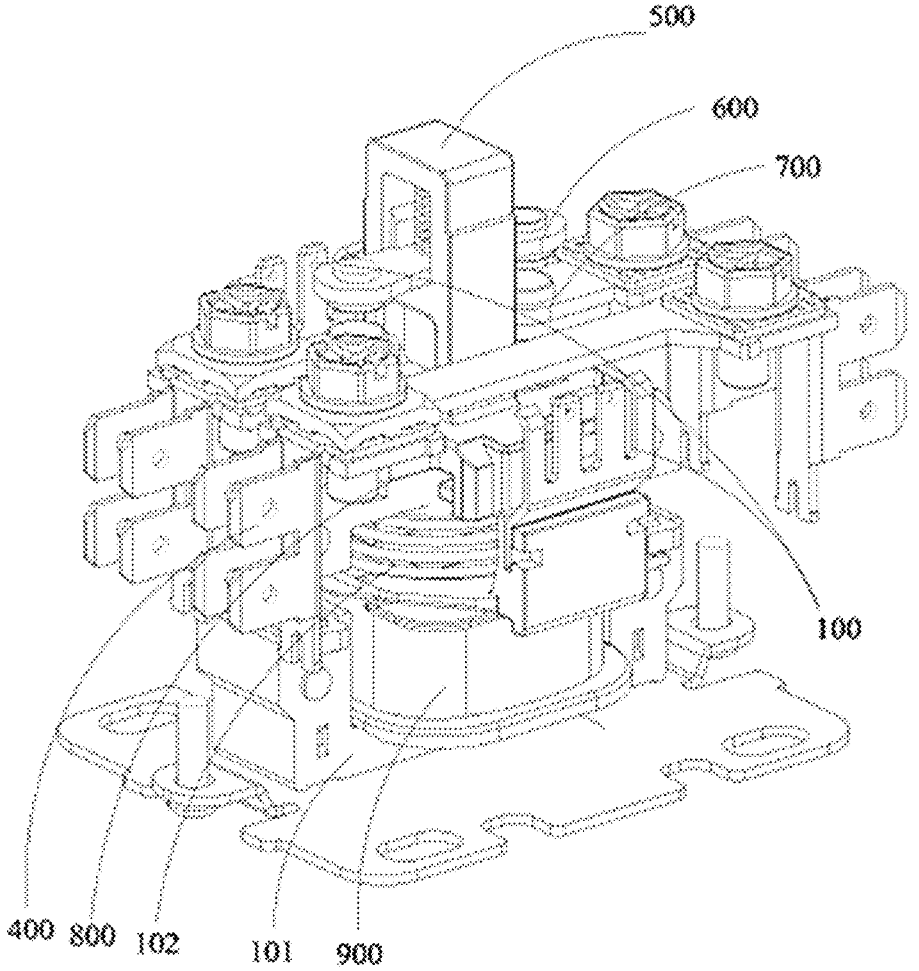
FIG. 9 shows the schematic structure of the contactor according to the invention.

In an embodiment, as shown in FIG. 9, the contactor includes an electromagnetic system and a contact system. The electromagnetic system includes a magnet yoke 101, a coil assembly, an iron core, and a counterforce spring 102. The magnet yoke 101 and the coil assembly are fixed on a housing. The contact system includes a contact support 500, a contact bridge 600, a reed (leaf), and a contact spring. The reed is specifically a leaf spring. The reed is installed between the contact support 500 and an armature 800, and the armature 800 and the contact support 500 are fixed by the reed. The counterforce spring 102 provides a counterforce along the first direction, which separates the contact support 500 from the magnet yoke 101 in normal state. There is a gap between the armature 800 and the magnet yoke 101. The contact plate 700 and the contact bridge 600 of the main circuit are in a disconnected state, such that the power at the power supply end of the contactor cannot be transmitted to the load end, and the load is in a stopped state.

The coil assembly includes a coil bobbin, a plug tab 100, and a coil 900 wound on a pin of the plug tab 100. The plug tab 100 receives power from the power system and transmits power from the power system to the coil 900. The plug tab 100 is provided by two, and the two plug tabs 100 are specifically wiring plug tabs, which can transmit power from the power supply to other electric loads.

A contactor generally has a power side terminal and a load side terminal. The power side terminal is at one end of the contactor for receiving power from the power system, and the load side terminal is at the other end of the contactor for transmitting power to the load. The power system supplies power to the electromagnetic system of the contactor through the coil plug tab, i.e., the plug tab 100. When the coil 900 is powered, the magnet yoke 101 and the armature 800 are magnetized to generate attractive force and attract each other. if the generated attractive force is larger than the counterforce of counterforce spring 102, the contact support 500 moves downward until the armature 800 and magnet yoke 101 are closed. At this time, the contact bridge 600 and the contact plate 700 of the main circuit are contacted and closed, and the power from the power supply end is transmitted to the load end, so that the load can be powered to operate. At this time, the power side terminal and the load side terminal are turned on, and the load starts to work after receiving power to complete the contactor closing process. When the coil 900 is powered off, the contact bridge 600 is reset under the action of the counterforce spring 102 and the contact spring, the power side terminal and the load side terminal are disconnected, and the load stops working to complete the contactor disconnection process.

It should be noted here, the plug tab 100 shown in the drawings and described in this description is only one example of adopting the principle of the invention. Those skilled in the art should clearly understand, the principle of the invention is not limited to any details or any components of the device shown in the drawings or described in the description.

It should be understood, the invention is not limited to the detailed structure and arrangement of components proposed in this description. The invention can have other embodiments, and can be implemented and carried out in various ways. The foregoing variations and modifications fall within the scope of the invention. It should be understood, the invention disclosed and defined in the description covers all alternative combinations of two or more individual features described and/or illustrated therein, and all of the different combinations constitute alternative aspects of the invention. The embodiments described in this description illustrate the best mode known for implementing the invention, and will enable those skilled in the art to use the invention.

REFERENCE SIGNS LIST

100: Plug tab; 200: First terminal; 300: Second terminal; 400: Plug-in tab; 500: Contact support; 600: Contact bridge; 700: Contact plate; 800: Armature; 900: Coil; 101: Magnet yoke; 102: Counterforce spring;
1: Body; 2: Plug-in part; 3: Error preventing part;
31: connecting part; 32: Bending part;
10: contactor.

What is claimed is:

1. A plug tab, wherein the plug tab comprises:
a body;
a plug-in part disposed on the body and configured to be detachably connected to a first terminal; and
an error preventing part disposed on the body and configured to interfere with plugging of a second terminal different from the first terminal into the plug-in part;
wherein:
along a second direction, a distance between the error preventing part and a side of the plug-in part is less than a width of an outer wall of the second terminal;
along the second direction, a width of the plug-in part is greater than a width of an inner cavity of the second terminal;
along a third direction, a thickness of an end of the error preventing part away from the body is greater than a thickness of the inner cavity of the second terminal, and
the second direction and the third direction are perpendicular to each other.

2. The plug tab according to claim 1, wherein the body, the plug-in part and the error preventing part are in an integrated structure.

3. The plug tab according to claim 1, wherein:
the error preventing part is a bending structure;
the error preventing part includes a connecting part and a bending part;
the connecting part and the plug-in part are arranged in parallel intervals;
the connecting part has a first end connected to the body and a second end connected to the bending part; and
the bending part is arranged at an included angle with the connecting part.

4. The plug tab according to claim 1, wherein the error preventing part protrudes from the body, such that the error preventing part serves to assist heat dissipation of the plug-in part.

5. The plug tab according to claim 1, wherein, along a first direction, a height of the error preventing part is greater than or equal to half of a height of the plug-in part.

6. The plug tab according to claim 1, wherein:
the error preventing part is a first error preventing part;
the plug tab further comprises a second error preventing part; and
the plug-in part is disposed between the first error preventing part and the second error preventing part.

7. A contactor, wherein the contactor comprises:
a first terminal;
a first conductive member;
a second terminal different from the first terminal; and
a plug tab comprising:
a body connected to the first conductive member;
a plug-in part disposed on the body and configured to be detachably connected to the first terminal; and
an error preventing part disposed on the body and configured to interfere with plugging of the second terminal into the plug-in part;
wherein:
along a second direction, a distance between the error preventing part and a side of the plug-in part is less than a width of an outer wall of the second terminal;
along the second direction, a width of the plug-in part is greater than a width of an inner cavity of the second terminal;
along a third direction, a thickness of an end of the error preventing part away from the body is greater than a thickness of the inner cavity of the second terminal, and
the second direction and the third direction are perpendicular to each other.

8. The contactor according to claim 7, wherein:

the plug tab comprises a plug-in unit formed of one or more plug-in parts disposed along the second direction, the plug-in part included in the one or more plug-in parts.

9. The contactor according to claim 7, wherein:

a gap is disposed between the error preventing part and the plug-in part;

the gap is configured to limit the first terminal; and the first terminal is clamped by the error preventing part and the plug-in part when disposed within the gap.

10. The contactor according to claim 7, wherein:

along a first direction, a height of the first terminal is smaller than that of the second terminal; and/or along a second direction, a width of the first terminal is smaller than that of the second terminal; and/or along a third direction, a thickness of the first terminal is smaller than that of the second terminal;

wherein the first direction, the second direction, and the third direction are perpendicular to each other.

11. The contactor according to claim 7, wherein:

the contactor further comprises:

a plug-in tab; and a second conductive member;

a first end of the plug-in tab is connected to the second conductive member; and a second end of the plug-in tab is configured to be detachably connected to the second terminal.

12. The contactor according to claim 11, wherein:

the first conductive member is a coil;

the plug tab is a coil plug tab;

the first terminal is a coil terminal;

the second conductive member is a static contact;

the plug-in tab is a main circuit plug tab; and the second terminal is a main circuit terminal.

13. The contactor according to claim 8, wherein:

the contactor further comprises:

a plug-in tab; and a second conductive member;

a first end of the plug-in tab is connected to the second conductive member; and a second end of the plug-in tab is configured to be detachably connected to the second terminal.

14. The contactor according to claim 13, wherein:

the first conductive member is a coil;

the plug tab is a coil plug tab;

the first terminal is a coil terminal;

the second conductive member is a static contact;

the plug-in tab is a main circuit plug tab; and the second terminal is a main circuit terminal.

15. The contactor according to claim 9, wherein:

the contactor further comprises:

a plug-in tab; and a second conductive member;

a first end of the plug-in tab is connected to the second conductive member; and a second end of the plug-in tab is configured to be detachably connected to the second terminal.

16. The contactor according to claim 15, wherein:

the first conductive member is a coil;

the plug tab is a coil plug tab;

the first terminal is a coil terminal;

the second conductive member is a static contact;

the plug-in tab is a main circuit plug tab; and the second terminal is a main circuit terminal.

17. The contactor according to claim 10, wherein:

the contactor further comprises:

a plug-in tab; and a second conductive member;

a first end of the plug-in tab is connected to the second conductive member; and a second end of the plug-in tab is configured to be detachably connected to the second terminal.

18. The contactor according to claim 17, wherein:

the first conductive member is a coil;

the plug tab is a coil plug tab;

the first terminal is a coil terminal;

the second conductive member is a static contact;

the plug-in tab is a main circuit plug tab; and the second terminal is a main circuit terminal.

* * * * *